United States Patent [19]
Yamaguchi

[11] Patent Number: 5,588,605
[45] Date of Patent: Dec. 31, 1996

[54] BRAKING FORCE ADJUSTING DEVICE IN A FISHING REEL

[75] Inventor: Nobuyuki Yamaguchi, Tokyo, Japan

[73] Assignee: Daiwa Seiko, Inc., Tokyo, Japan

[21] Appl. No.: 301,886

[22] Filed: Sep. 7, 1994

[30] Foreign Application Priority Data

Sep. 8, 1993 [JP] Japan ................... 5-053616 U

[51] Int. Cl.$^6$ ................... A01K 89/015; A01K 89/02
[52] U.S. Cl. ........................... 242/268; 242/302
[58] Field of Search ................... 242/302, 303, 242/267, 268; 411/111, 112, 113, 119, 120, 121, 122, 123, 124; 464/37

[56] References Cited

U.S. PATENT DOCUMENTS

| | | | |
|---|---|---|---|
| 2,189,654 | 2/1940 | Rief | 411/121 |
| 3,510,083 | 5/1970 | Cook | 242/303 X |
| 3,804,349 | 4/1974 | Serini et al. | 242/303 X |
| 4,906,150 | 3/1990 | Bennett | 411/120 X |
| 5,285,985 | 2/1994 | Sakaguchi | 242/302 |
| 5,322,240 | 6/1994 | Sato | 242/302 |

FOREIGN PATENT DOCUMENTS

| | | |
|---|---|---|
| 58-44071 | 3/1983 | Japan . |
| 63-68774 | 5/1988 | Japan . |

*Primary Examiner*—Daniel P. Stodola
*Assistant Examiner*—William A. Rivera
*Attorney, Agent, or Firm*—Longacre & White

[57] ABSTRACT

A braking force adjusting device for a fishing reel in which a nut on the market is combined, as a threaded engaging member, with the adjuster, so that the resultant adjuster is simple in construction and low in manufacturing cost. The adjuster includes an engaging portion, a central through-hole, operating levers (forming an operating member) turned with the fingers, and a fitting polygonal recess at the center. The engaging portion corresponds to the bottom of the recess. The threaded engaging member, which is a nut on the market, is fitted in the fitting polygonal recess merely by setting it therein. The threaded engaging member is engaged with the male-threaded portion of the handle shaft.

13 Claims, 6 Drawing Sheets

BRAKING FORCE ADJUSTING DEVICE IN A FISHING REEL

BACKGROUND OF THE INVENTION

This invention relates to a braking force adjusting device in a fishing reel in which an adjuster is improved which is adapted to adjust the brake force of a drive gear which is rotatably and frictionally coupled through a braking member to a handle shaft.

A fishing reel has a drag mechanism for applying a braking force to the spool which is rotatably supported between the side plates of the reel body. The drag mechanism includes an adjuster for adjusting a frictional force to couple the drive gear to the handle shaft. The adjuster, as disclosed by Japanese Utility Patent Application (OPI) No. 44071/1983 or 68774/1988 (the term "OPI" as used herein means an "unexamined application"), is made up of an operating member and a threaded engaging boss which is threadably engaged with the handle shaft.

The threaded engaging boss is formed by shaping and female-threading a metal material. An operating member made of an aluminum or brass plate is made integral with the threaded engaging boss by caulking or by welding.

On the other hand, in order to allow the angler to use the fishing reel pleasantly, the operating member is made of synthetic resin, and the threaded engaging boss is made integral with the operating member of synthetic resin by insert-molding.

The formation of any one of the above-described adjusters requires a manufacturing step of making the operating member integral with the threaded engaging boss, which increases the manufacturing cost of the adjuster and accordingly the fishing reel.

Hence, problems to be solved by the invention are as follows: The manufacture of the threaded engaging boss is rather troublesome because, as was described above, it is formed by shaping and female-threading a metal material. In the case where the threaded engaging boss and the operating member are provided separately, it is necessary to provide a manufacturing step of making them integral with each other. Thus, the manufacture of the adjuster takes time and labor. The resultant adjuster is unavoidably expensive.

SUMMARY OF THE INVENTION

In view of the foregoing, an object of the invention is to provide a braking force adjusting device for a fishing reel in which a nut on the market is combined, as a threaded engaging member, with the adjuster, so that the resultant adjuster is simple in construction and low in manufacturing cost.

The foregoing object of the invention has been achieved by the provision of a braking force adjusting device for a fishing reel in which an adjuster for adjusting the braking force of a drive gear which is rotatably mounted on and frictionally coupled through a braking member to a handle shaft to the end of which a handle is connected, is threadably engaged with the handle shaft so as to be freely moved back and forth; in which, according to the invention an operating member which forms the adjuster and is turned with the fingers, and a threaded engaging member are formed separately, the threaded engaging member is fitted in a fitting recess which is formed in the adjuster at the center, the threaded engaging member being prevented from coming off the adjuster, and an engaging portion corresponding to the bottom of the fitting recess is adapted to push the braking member.

The threaded engaging member is combined with the adjuster as follows: That is, the threaded engaging member, which is a nut on the market, is fitted in the engaging polygonal recess of the adjuster merely by setting it therein. This makes it unnecessary to female-thread the adjuster or to work the latter so as to be integral with the threaded engaging member.

The adjuster may be changed in configuration, in material, and in color with high degrees of freedom, and it may be modified in various manners to meet the requirements of a number of anglers.

BRIEF DESCRIPTION OF THE DRAWINGS

FIG. 8 is a plane view, partly as an enlarged view, showing an adjuster in which the threaded engaging member is fitted.

DETAILED DESCRIPTION OF THE PREFERRED EMBODIMENTS

The invention will be described with reference to its preferred embodiments shown in the accompanying drawings.

Figure 1:
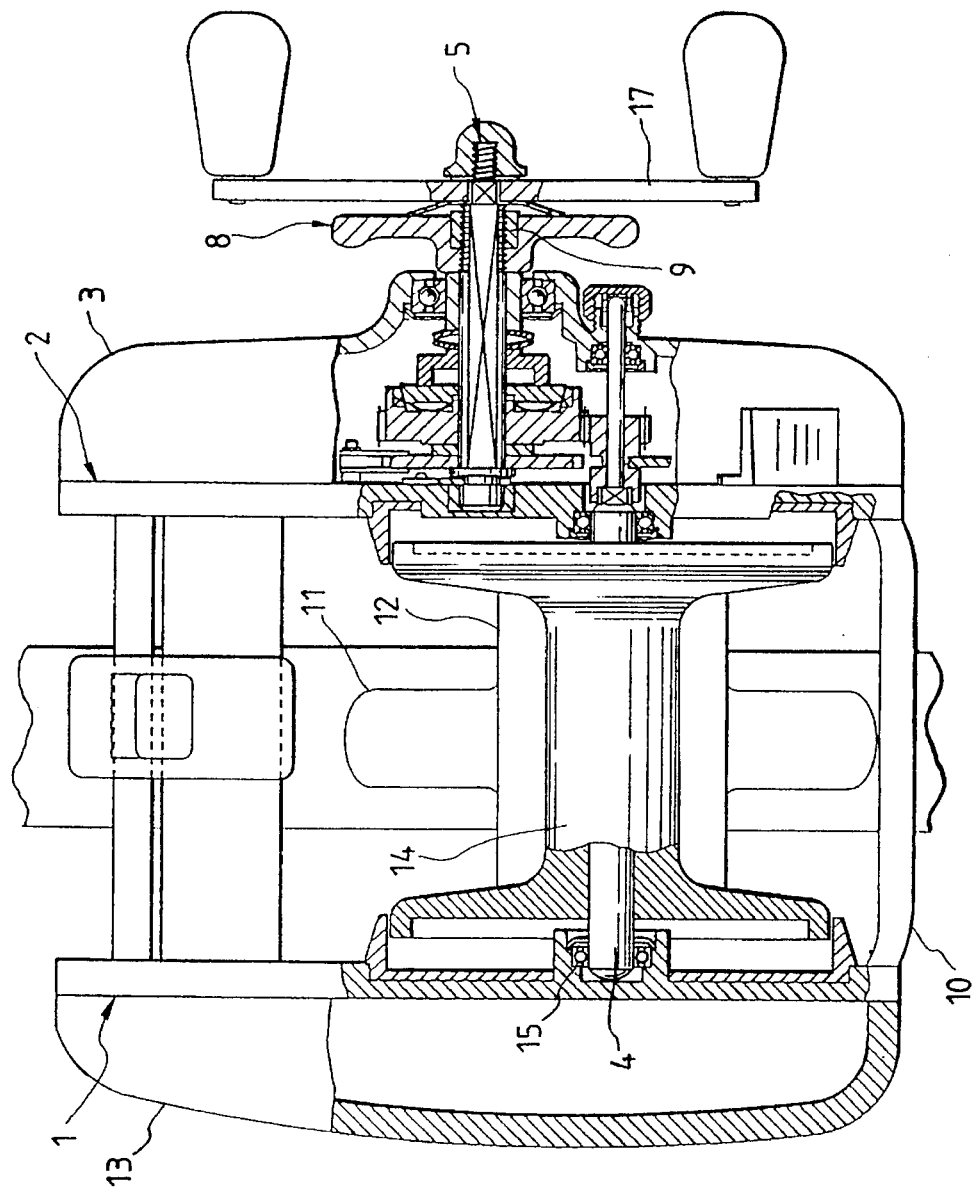
FIG. 1 is a plane view showing essential components of a dual bearing type fishing reel, which constitutes a first embodiment of the invention.
Figure 2:
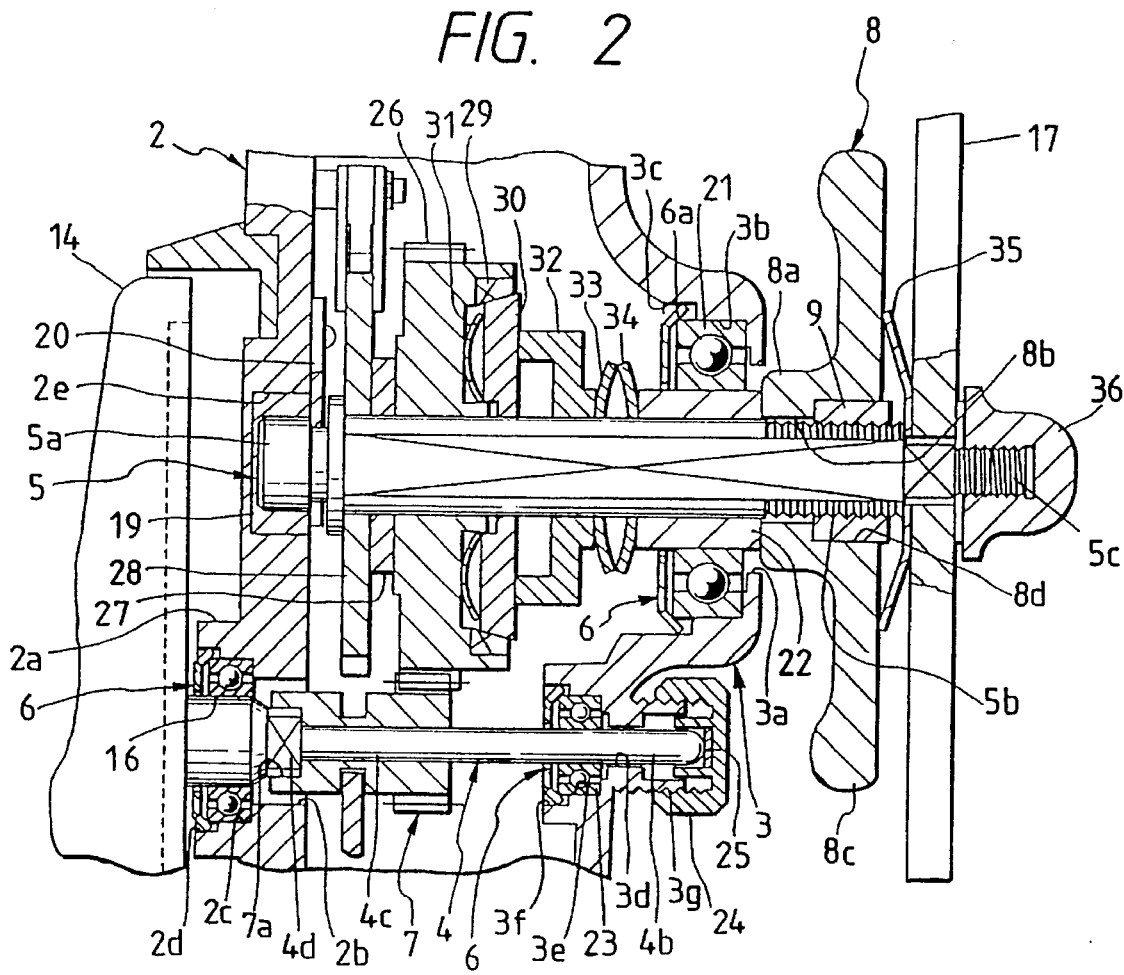
FIG. 2 is an enlarged sectional view showing essential components of the right frame and a reel side plate of the dual bearing type fishing reel.
Figure 3:
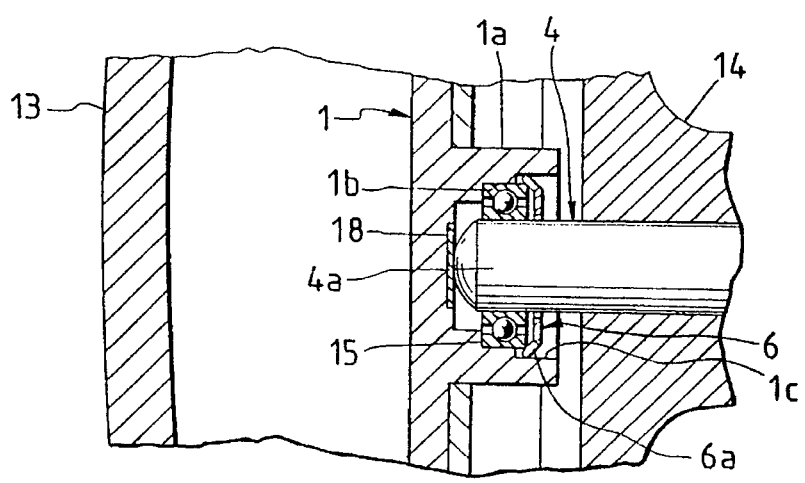
FIG. 3 is also an enlarged sectional view showing essential components of the left frame and a reel side plate of the dual bearing type fishing reel.
Figure 4:
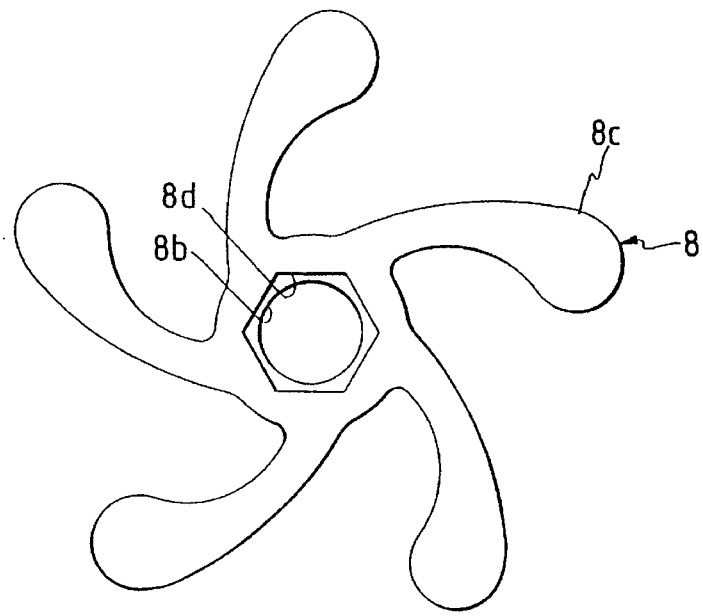
FIG. 4 is a front view of an adjuster in the fishing reel.
Figure 5:
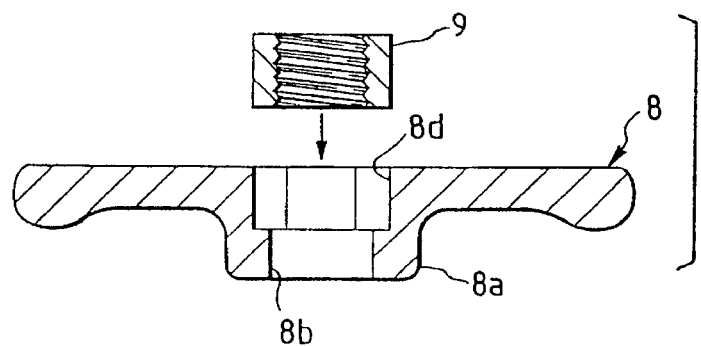
FIG. 5 is an exploded sectional side view showing the adjuster and a threaded engaging member.
Figure 6A:
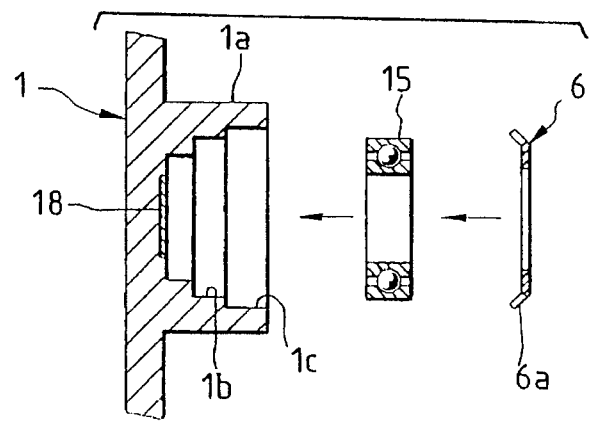
FIG. 6(a) is an exploded sectional side view showing a bearing holding structure.
Figure 6B:
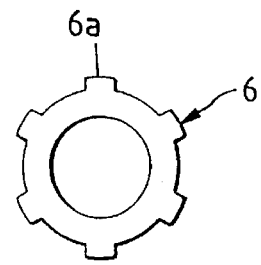
FIG. 6(b) is a plane view of a holding member.

FIGS. 1 through 6(b) show a dual bearing type fishing reel according to the invention. More specifically, FIG. 1 is a plan view showing essential components of the dual bearing type fishing reel, FIG. 2 is an enlarged sectional view showing essential components of the right frame and a reel side plate of the dual bearing type fishing reel; FIG. 3 is also an enlarged sectional view showing essential components of the left frame and a reel side plate of the dual bearing type fishing reel; FIG. 4 is a front view of an adjuster; FIG. 5 is an exploded sectional side view showing the adjuster and a threaded engaging member; and FIG. 6(a) is an exploded sectional side view showing a bearing holding structure, and FIG. 6(b) is a plan view of a holding member.

The dual bearing type fishing reel according to the invention, as shown in FIG. 1, comprises right and left frames 2 and 1 which are held in parallel with each other by supports 10 and a fixing plate 12 provided for a reel leg 11. Reel side plates 3 and 13 are provided outside the right and left frames 2 and 1, respectively.

A spool 14 is provided between the right and left frames 2 and 1. More specifically, the spool 14 is fixedly mounted on a spool shaft 4 which is rotatably supported by a pair of bearings 15 and 16. That is, the spool 14 is rotated through a clutch mechanism and gear train mechanism by a handle 17 mounted on a handle shaft 5.

As shown in FIGS. 1, 3, and 6(a), a shaft receiving cylinder 1a is protruded inwardly from the left frame 1 so as to receive the left end portion of the spool shaft.

The shaft receiving cylinder 1a has a first recess 1b into which the aforementioned bearing 15 is fitted in the shaft receiving cylinder 1a. A thrust bearing 18 is fixedly mounted on the bottom of the shaft receiving cylinder 1a. One end 4a of the spool shaft 4 is abutted against the thrust bearing 18.

The shaft receiving cylinder 1a has a second recess 1c in the outer edge which is larger in diameter than the aforementioned first recess 1b. The tongue pieces 6a of a holding member 6 are fixedly engaged with the second recess 1c to prevent the bearing 15 from coming off the shaft receiving cylinder 1a.

As shown in FIG. 2, another shaft receiving cylinder 2a is protruded from the right frame 2 which has a through-hole 2b and recesses 2c and 2d which are arranged coaxially.

The aforementioned bearing 16 is fitted in the recess 2c, and the tongue pieces 6a of another holding member 6 are fixedly engaged with the recess 2d to prevent the bearing 16 from coming off the shaft receiving cylinder 2a.

A bearing 19 is fitted in a recess 2e which is formed in the right surface of the right frame 2. One end portion 5a of the above-described handle shaft 5 is rotatably fitted in the bearing, and it is prevented from coming off by retaining plate 20.

The reel side plate 3 has a through-hole 3a and recesses 3b and 3c which are coaxial with one another.

A bearing 21 is fitted in the recess 3b. The tongue pieces 6a of another holding member 6 are fixedly engaged with the recess 3c to prevent the bearing 21 from coming off. The handle shaft 5 is supported by the bearing 21 through a collar 22 which is fitted on the handle shaft 5 in such a manner that it is movable along the handle shaft 5 and is not rotatable around the handle shaft 5.

The reel side plate 3 further has a through-hole 3d and recesses 3e and 3f which are coaxial with one another.

A bearing 23 is fitted in the recess 3e. The tongue pieces 6a of another holding member 6 are fixedly engaged with the recess 3f to prevent the bearing 23 from coming off.

The bearing 23 supports the other end portion 4b of the spool shaft 4. More specifically, the bearing 23 supports the end portion 4b of the right part 4c of the spool shaft 4 which is smaller in diameter than the left part.

A shaft receiving cylinder 3g is protruded from the right surface of the reel side plate 3. The outer cylindrical surface of the shaft receiving cylinder 3g is male-threaded.

A cover knob 24 is threadably engaged with the shaft receiving cylinder 3g. The end portion 4b of the right part 4c of the spool shaft 4 is abutted against a thrust bearing 25 set on the bottom of the cover knob 24.

A pinion 7 is mounted on the right part 4c of the spool shaft 4 between the right frame 2 and the reel side plate 3 in such a manner that it is axially movable. The engaging portion 7a of the pinion 7 and the engaging portion 4d of the spool shaft 4 form a clutch mechanism.

The pinion 7 is engaged with a drive gear 26 which is rotatably mounted on the handle shaft 5.

A friction board 27 is mounted on the handle shaft 5 on the left side of the drive gear 26, and a ratchet 28 is mounted on the handle shaft 5 on the left side of the friction board 27 in such a manner that it is prevented from turning relative to the handle shaft 5.

A friction board 29 is fixedly secured to the right surface of the drive gear 26, and a friction disk 30 is mounted on the handle shaft 5 in such a manner that it is prevented from turning relative to the handle shaft 5 and is abutted against the friction board 29.

A curved spring 31 is interposed between the drive gear 26 and the friction disk 30.

A pushing board 32 is mounted on the handle shaft 5 in such a manner that it is prevented from turning relative to the latter 5 and is abutted against the right surface of the friction disk 30.

Furthermore, springs 33 and 34 are mounted on the handle shaft 5 in such a manner that they are prevented from turning relative to the handle shaft 5 and abutted against the right surface of the pushing board 32.

The above-described collar 22 is abutted against the right surface of the spring 34.

The friction board 29, the friction disk 30, the curved spring 31, the springs 33 and 34, and the collar 22 form a braking member. The braking member mounted on the handle shaft 5, together with the adjuster 8 and the threaded engaging member 9 form a braking force adjusting device.

The adjuster 8, as shown in FIGS. 1, 2, 4 and 5, includes an engaging portion 8a, a central through-hole 8b, operating levers 8c (forming an operating member) which are turned with the fingers, and a fitting engaging polygonal recess 8d. The bottom of the polygonal recess 8d corresponds to the engaging portion 8a.

The threaded engaging member 9, which is a nut on the market, is fitted in the engaging polygonal recess 8d merely by setting it in the latter.

The threaded engaging member 9 is threadably engaged with the male-threaded portion 5b of the handle shaft 5.

A compression spring 35 and the handle 17 are mounted on the other end portion 5c of the handle shaft 5 on the right side of the threaded engaging member 9, in such a manner that the handle 17 is prevented from turning relative to the handle shaft 5 and it is further prevented from coming off with a nut 36.

The dual bearing type fishing reel operates as follows: When the handle 17 is turned, the spool shaft 4 and the spool 14 are turned through the handle shaft 5 and the gear train mechanism.

The braking force of the drive gear 26 which is rotatably mounted on and frictionally coupled to the handle shaft 5 through the braking member can be adjusted by turning the adjuster 8. That is, as the adjuster 8 is turned, the threaded engaging member 9 is moved, so that the engaging portion 8a of the adjuster 8 pushes the collar 22 whereby the braking member is pushed; that is, the braking force is adjusted.

As is apparent from the above description, in the braking force adjusting device, the adjuster 8 is formed by fitting the threaded engaging member 9, which is a nut on the market, in the fitting polygonal recess 8d. Hence, the provision of the above-described adjuster 8 eliminates the difficulties accompanying the prior art that it is necessary to female-thread the threaded engaging boss portion and to work the threadably boss portion and the operation portion integral so that they are integral with each other, with the results that the braking force adjusting device can be readily manufactured at low cost.

The adjuster 8 may be changed in configuration, in material, and in color with high degrees of freedom, and it may be modified in various manners to meet the requirements of a number of anglers.

Figure 7A:
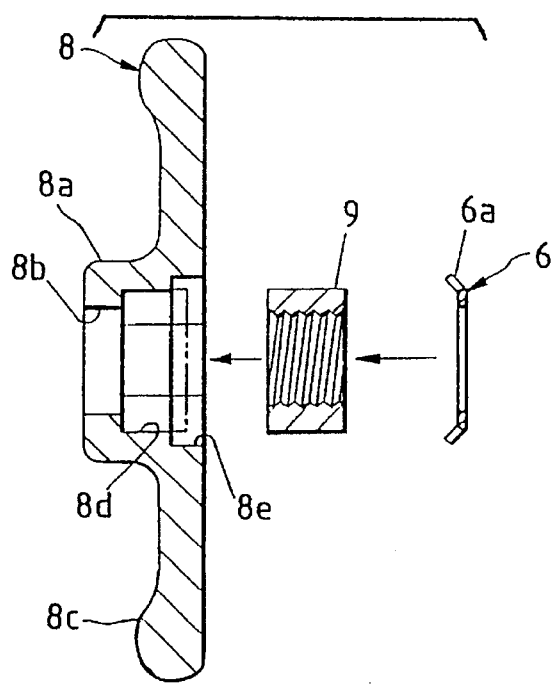
FIGS. 7(a) and 7(b) show a second embodiment of the invention in which a threaded engaging member is prevented from coming off an adjuster, FIG. 7(a) being an exploded sectional side view showing the adjuster and the threaded engaging member, and FIG. 7(b) being a plane view of the holding member.
Figure 7B:
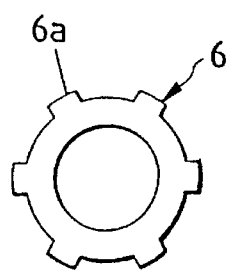

FIGS. 7(a) and 7(b) shows a second embodiment of the invention in which a threaded engaging member is prevented from coming off an adjuster. FIG. 7(a) is an exploded sectional side view showing the adjuster and the threaded engaging member.

As shown in FIG. 7(a), the adjuster 8 includes an engaging portion 8a, a central through-hole 8b, operating levers 8c (forming an operating member) which are turned with the fingers, a fitting polygonal recess 8d, and a recess 8e.

The threaded engaging member 9 is fitted in the fitting polygonal recess 8d merely by setting it in the latter. The tongue pieces 6a of a holding member 6 which is similar to those 6 which have been described above are engaged in the recess 8e to prevent the threaded engaging member 9 from coming off the adjuster 8.

Figure 8:
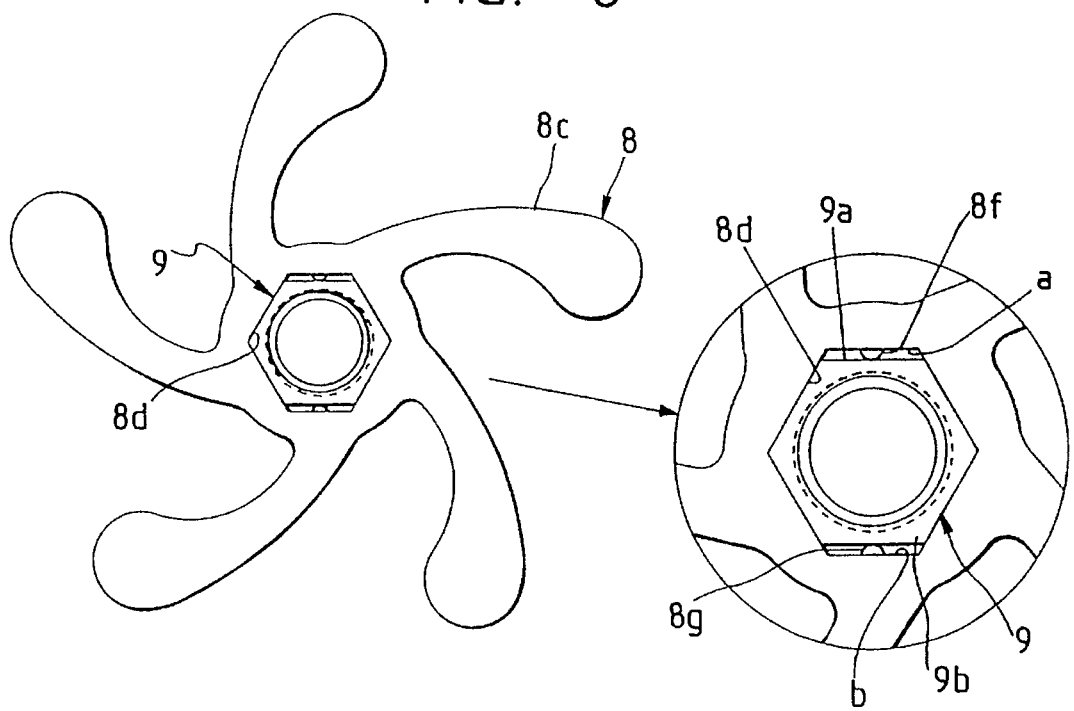
FIG. 8 shows a third embodiment of the invention in which a threaded engaging member is prevented from coming off. More specifically.

FIG. 8 shows a third embodiment of the invention in which a threaded engaging member is prevented from coming off. FIG. 8 is a plan view, partly as an enlarged view, showing an adjuster in which the threaded engaging member is fitted.

As shown in FIG. 8, the adjuster 8 includes a fitting polygonal recess 8d at the center. The distance between two opposite sides a and b of the recess 8d is larger than the width (the distance between two opposite sides 9a and 9b) of the threaded engaging member 9. The two sides a and b have protrusions 8f and 8g which are abutted against the corresponding two sides 9a and 9b of the threaded engaging member 9.

When the threaded engaging member 9 is fitted in the fitting polygonal recess 8d by setting it in the latter, the two sides 9a and 9b of the threaded engaging member 9 push the protrusions 8f and 8g, so that the threaded engaging member 9 is made integral with the adjuster 8. In the above-described third embodiment, two sides a and b of the polygonal recess 8d are utilized; however, instead of the two sides, one side may be employed; that is, a protrusion may be extended from one side of the polygonal recess.

FIGS. 9 to 12 show a fourth embodiment of the invention.

Figure 9:
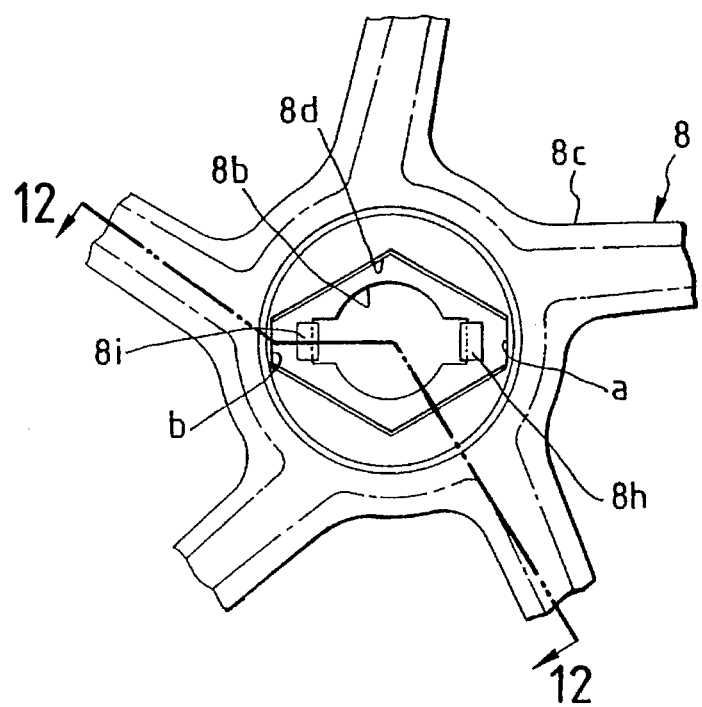
FIG. 9 is a plane view showing an adjuster of a brakign force adjusting device according to a fourth embodiment of the invention, from which a threaded engagement member is removed.
Figure 10:
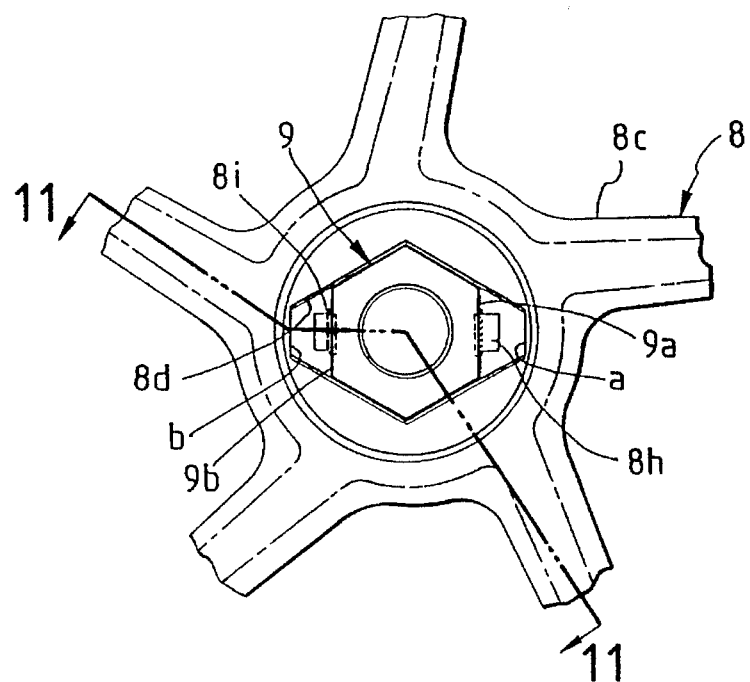
FIG. 10 is a plane view showing the adjuster shown in FIG. 9, to which the threaded engagement member is set.
Figure 11:
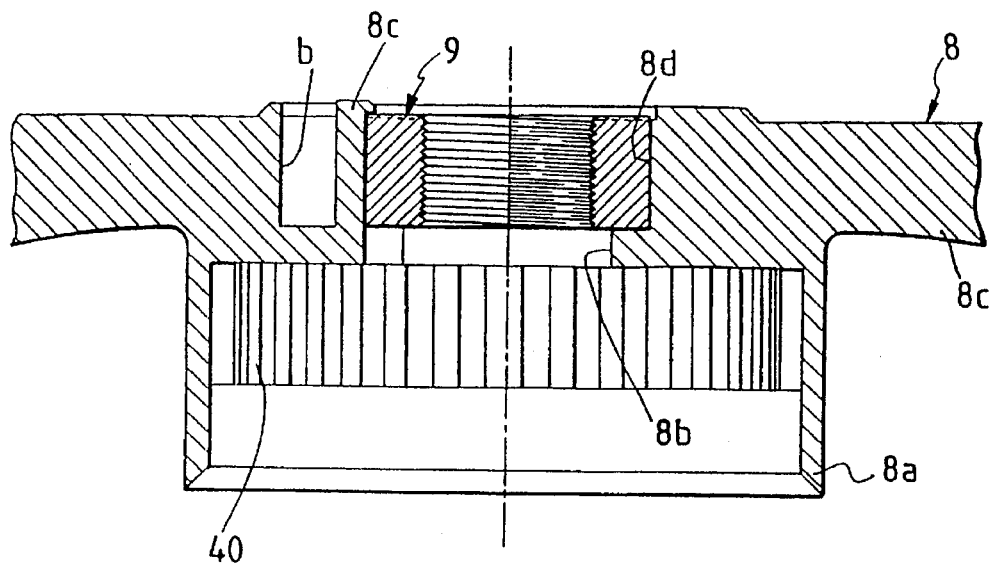
FIG. 11 is a sectional view taken along line 11—11 in FIG. 10.
Figure 12:
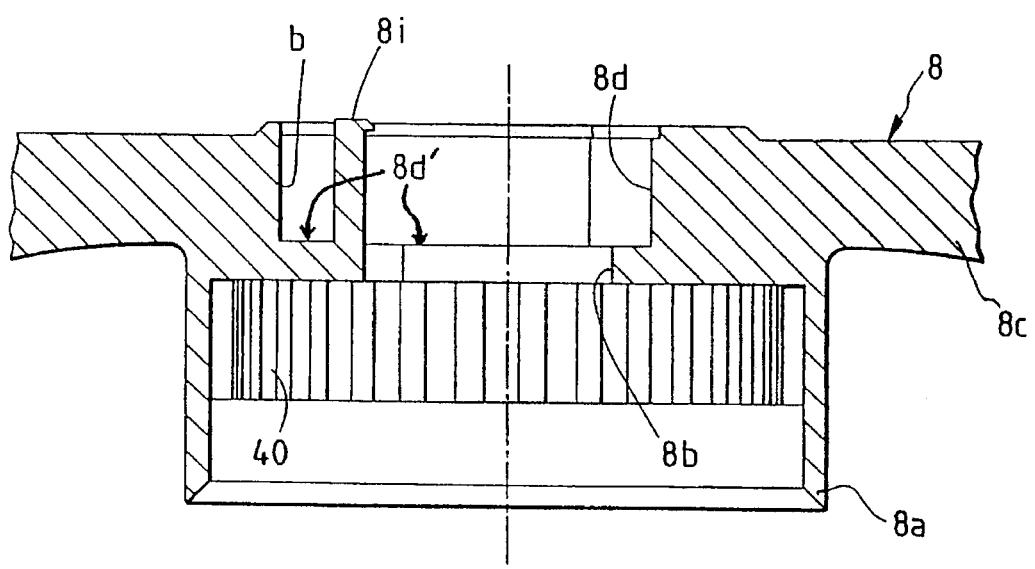
FIG. 12 is a sectional view taken along line 12—12 in FIG. 9.

As shown in FIGS. 9 and 10, the adjuster 8 includes a fitting polygonal recess 8d at the center. As similarly to the third embodiment, the distance between two opposite sides a and b of the recess 8d is larger than the width (the distance between two opposite sides 9a and 9b) of the threaded engaging member 9. In place of the radially inwardly projected protrusions 8f and 8g of the third embodiment, the adjuster 8 of the fourth embodiment is formed with a pair of flexible retainment pieces 8h and 8i each of which is projected from the stepped portion 8d' formed at the bottom of the fitting polygonal recess 8d in the axial direction of the adjuster 8. Each of the flexible retainment piece 8h and 8i has a claw portion at a distal end thereof for engagement with the upper surface of the threaded engaging member 9 when the threaded engaging member 9 is fitted into the polygonal recess 8d.

During the fitting process of the threaded engaging member 9 into the fitting recess 8d, the flexible retainment pieces 8h and 8i are elastically deformed radially outwardly, and when the threaded engaging member 9 is completely fitted into the polygonal recess 8d the flexible retainment pieces 8h and 8i restored radially inwardly to their original positions so that the claw portions thereof is engaged with the upper surface of the threaded engaging member 9. Thus, the threaded engaging member 9 is made integral with the adjuster 8. In the above-described fourth embodiment, two flexible retainment pieces 8h and 8i are utilized; however, instead of the two retainment pieces, only one flexible retainment piece may be employed; that is, a flexible retainment piece may be extended from the bottom of the polygonal recess and one of the two side a and b where the retainment piece is not provided may be brought into abutment with the corresponding side of the threaded engaging member. In addition, reference numeral 40 designates internal teeth for an adjuster click mechanism.

While the invention has been described with reference to the dual bearing type fishing reel, it goes without saying that the technical concept of the invention may be equally applied to other type fishing reels.

In addition, the components of the braking force adjusting device may be modified in configuration in various manners.

As is apparent from the above description, the braking force adjusting device according to the invention has the following practically outstanding effects or merits: Since the threaded engaging member, which is a nut on the market, is fitted in the engaging polygonal recess of the adjuster by setting it therein, it is unnecessary to female-thread the adjuster or to work it to make it integral with the threaded engaging member.

The adjuster may be changed in configuration, in material, and in color with high degrees of freedom, and it may be modified in various manners to meet the requirements of a number of anglers.

What is claimed is:

1. A braking force adjusting device in a fishing reel in which an adjuster adjusts the braking force of a drive gear which is rotatably mounted on and frictionally coupled through a braking member to a handle shaft to the end of which a handle is connected, said adjuster being threadably engaged with said handle shaft so as to be freely moved back and forth along a longitudinal axis of said handle shaft, comprising an improvement wherein:

said adjuster includes an operation member adapted to be turned with an operator's fingers, and a threaded engaging member, said operation member and said threaded engaging member being formed separately from each other;

said threaded engaging member is axially slidingly received and non-rotatably fitted in a fitting recess which is formed in said operation member, said threaded engaging member comprising at least one outer planar surface extending an entire axial length of said threaded engaging member, said outer planar surface contacting said fitting recess along at least one inner planar surface formed on said operation member to prevent relative rotation therebetween, wherein said planar surface permits said threaded engaging member to slide axially relative to said operation member; and an engaging portion adjacent to said fitting recess is adapted to push said braking member.

2. The device according to claim 1, wherein said engaging portion is interposed between said adjuster and said braking member.

3. The device according to claim 1, wherein said fitting recess is formed into a polygonal shape.

4. The device according to claim 3, wherein said braking member depresses said operation member against said nut so as to retain said operation member in place.

5. The device according to claim 1, wherein said operation member is formed with a through-hole communicating with said fitting recess, said through-hole is smaller in diameter than said fitting recess to define a stepped portion within said operation member.

6. The device according to claim 1, wherein:

said operation member is formed with a through-hole smaller in diameter than said fitting recess to define said bottom of said fitting recess, and an engaging recess larger in diameter than said fitting recess for engagement with a holding member;

said through-hole, said fitting recess and said engaging recess are arranged in this order coaxially; and said threaded engaging member fitted in said fitting recess is held between said bottom and said holding member engaged with said engaging recess.

7. The device according to claim 1, wherein said threaded engaging member comprises a plurality of outer peripheral surfaces forming a polygonal shape when viewed in cross-section, each of said outer peripheral surfaces being defined by a continuous planar surface formed to abut corresponding fitting surfaces which define said fitting recess.

8. The device according to claim 7, wherein said continuous planar surface extends an entire longitudinal length of said threaded engaging member along said longitudinal axis.

9. A braking force adjusting device in a fishing reel in which an adjuster adjusts the braking force of a drive gear which is rotatably mounted on and frictionally coupled through a braking member to a handle shaft to the end of which a handle is connected, said adjuster being threadably engaged with said handle shaft so as to be freely moved back and forth along a longitudinal axis of said handle shaft, comprising an improvement wherein:

said adjuster includes an operation member adapted to be turned with an operator's fingers, and a threaded engaging member, said operation member and said threaded engaging member being formed separately from each other;

said threaded engaging member is non-rotatably fitted in a fitting recess which is formed in said operation member; and an engaging portion adjacent to said fitting recess is adapted to push said braking member;

wherein said operation member is formed with a flexible retainment piece for elastically retaining said threaded engaging member in said fitting recess.

10. The device according to claim 9, wherein said flexible retainment piece is projected orthogonally from a stepped portion within said operation member.

11. The device according to claim 9, wherein said fitting recess prevents rotation of said threaded engaging member about an axis with respect to said operation member, and said flexible retainment piece prevents movement of said threaded engaging member along said axis relative to said operation member.

12. The device according to claim 9, wherein said flexible retainment piece has a claw portion adapted to clamp said threaded engaging member in cooperation with a stepped portion adjacent to said fitting recess.

13. A braking force adjusting device in a fishing reel in which an adjuster adjusts the braking force of a drive gear which is rotatably mounted on and frictionally coupled through a braking member to a handle shaft to the end of which a handle is connected, said adjuster being threadably engaged with said handle shaft so as to be freely moved back and forth along a longitudinal axis of said handle shaft, comprising an improvement wherein:

said adjuster includes an operation member adapted to be turned with an operator's fingers, and a threaded engaging member, said operation member and said threaded engaging member being formed separately from each other;

said threaded engaging member is non-rotatably fitted in a fitting recess which is formed in said operation member, said threaded engaging member comprises a plurality of outer peripheral surfaces forming a polygonal shape when viewed in cross-section, each of said surfaces being defined by a continuous planar surface extending an entire axial length of said threaded engaging member and formed to abut corresponding fitting surfaces which define said fitting recess, wherein said continuous planar surface permits said threaded engaging member to slide axially relative to said operation member; and an engaging portion adjacent to said fitting recess is adapted to push said braking member.

* * * * *